(12) United States Patent (10) Patent No.: US 9,156,719 B2
Perrone et al. (45) Date of Patent: Oct. 13, 2015

(54) GLASS CONTAINER WITH INTERNALLY THREADED NECK

(75) Inventors: Dalmazio Perrone, Asti (IT); Frederico Campodonico, Genoa (IT); Gino Giovanni Brignolo, Trezzano sul Naviglio (IT); Ambrogio Morettin, Cinto Caomaggiore (IT); Benoit Villaret De Chauvigny, Sinte Foy les Lyons (FR)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 13/701,279

(22) PCT Filed: May 30, 2011

(86) PCT No.: PCT/EP2011/002664
§ 371 (c)(1),
(2), (4) Date: Jun. 28, 2013

(87) PCT Pub. No.: WO2011/151050
PCT Pub. Date: Dec. 8, 2011

(65) Prior Publication Data
US 2013/0270211 A1 Oct. 17, 2013

(30) Foreign Application Priority Data

May 31, 2010 (FR) .................................... 10 54201
Jun. 16, 2010 (IT) ............................. MI2010A1085

(51) Int. Cl.
*B65D 39/08* (2006.01)
*C03B 9/193* (2006.01)
(Continued)

(52) U.S. Cl.
CPC ............ *C03B 9/1932* (2013.01); *B65D 1/0246* (2013.01)

(58) Field of Classification Search
CPC ... A01B 12/006; C03B 9/1932; B65D 1/0246
USPC ............................................ 215/44, 356, 357
See application file for complete search history.

(56) References Cited

U.S. PATENT DOCUMENTS

| 13,402 A | 8/1855 | Stone |
| 30,106 A | 9/1860 | Focer |
| 130,208 A | 8/1872 | Frank |

(Continued)

FOREIGN PATENT DOCUMENTS

| DE | 183525 | 4/1907 |
| DE | 321345 | 5/1920 |

(Continued)

OTHER PUBLICATIONS

PCT International Search Report and Written Opinion Date: Aug. 2, 2011 App No. PCT/EP2011/002664 Filing Date: May 30, 2011.

*Primary Examiner* — Mickey Yu
*Assistant Examiner* — Niki Eloshway

(57) ABSTRACT

The present invention relates to a glass container with a cylindrical neck (1) suitable for plugging the container by means of a stopper inserted in said neck, said neck (1) comprises an internal thread (6) allowing for reversible plugging and unplugging of the container by screwing and unscrewing said stopper, wherein the internal thread (6) of the neck consists of at least two independent thread turns (7) allowing unplugging and plugging of the container by screwing and respectively unscrewing the stopper by rotating it over an angle of less than 180°.

21 Claims, 3 Drawing Sheets

(51) Int. Cl.
B65D 1/02 (2006.01)
B65D 23/00 (2006.01)

(56) References Cited

U.S. PATENT DOCUMENTS

| | | | |
|---|---|---|---|
| 480,774 | A | 8/1892 | Leng |
| 509,214 | A | 11/1893 | Friedrich |
| 509,525 | A | 11/1893 | Gray |
| 606,200 | A | 6/1898 | Friedrich |
| 36,781 | A | 2/1904 | Blower |
| 767,515 | A | 8/1904 | Forster |
| 1,502,560 | A | 7/1924 | Glaspey |
| 1,560,158 | A | 11/1925 | Glaspey |
| 1,560,159 | A | 11/1925 | Glaspey |
| 1,695,894 | A | 12/1928 | Glaspey |
| 2,026,304 | A | 12/1935 | Deady |
| 2,609,955 | A | 9/1952 | Moore |
| 5,947,310 | A | 9/1999 | Wagner |
| 6,102,225 | A | 8/2000 | Lynn |
| 6,216,897 | B1 | 4/2001 | Wagner |
| 6,398,050 | B1 * | 6/2002 | Allora ........................ 215/228 |
| 2001/0052508 | A1 | 12/2001 | Wagner |
| 2003/0057173 | A1 | 3/2003 | Wagner |
| 2006/0151422 | A1 * | 7/2006 | Manley ........................ 215/341 |
| 2007/0125720 | A1 | 6/2007 | Stecca |
| 2010/0264107 | A1 | 10/2010 | Lonsway et al. |
| 2010/0270260 | A1 | 10/2010 | Jung |

FOREIGN PATENT DOCUMENTS

| | | |
|---|---|---|
| DE | 4236245 | 5/1994 |
| EP | 0027780 | 1/1985 |
| EP | 0225293 | 6/1987 |
| EP | 0667300 | 6/1999 |
| EP | 1254060 | 9/2004 |
| FR | 331.391 | 4/1903 |
| FR | 1.246.454 | 10/1960 |
| FR | 2881421 | 8/2006 |
| GB | 132589 | 9/1919 |
| JP | 62-003028 | 1/1987 |
| JP | 2001-322161 | 11/2001 |
| KR | 20-0255577 | 12/2001 |
| WO | WO 2011/151050 A1 | 12/2011 |

* cited by examiner

GLASS CONTAINER WITH INTERNALLY THREADED NECK

FIELD OF THE INVENTION

The present invention relates to glass containers such as glass bottles and more specifically to glass bottles that are filled with wine and/or spirits and corked with a cork stopper.

BACKGROUND AND SUMMARY OF THE DISCLOSURE

In the domain of wine containers, different types of plugs are used to seal bottles containing wine that are sold on the market.

It is known for many decades to plug wine and spirit bottles by means of a cylindrical cork stopper which is pressed in the neck of the bottle with a certain compression rate. Although this technique has been used exclusively for a very long time, in recent years the cork stopper was called into question again for various reasons linked mainly to the cost and the quality of the stored wine, in particular the development of the so-called "cork" taste.

Compressible stoppers made of synthetic material were developed as replacements for wine bottle cork stoppers and are being used more and more. These compressible synthetic stoppers are considered neutral relative to the bottled wine, and their cost is easier kept under control than that of cork stoppers. However, they have the disadvantage of having low or no recyclability and are not always being easy to extract. These synthetic stoppers also may evoke an image with consumers of industrial production and low quality.

It is also known that wine bottles can be plugged with screw caps. This plugging technique can be well controlled and the preservation performance is considered similar to that of cork or synthetic stoppers. Furthermore, screw caps are recyclable, at least in theory, after separating the internal liner from the cap. However, especially in Europe, this plugging technique may still be considered reserved for low range wines and wines from the so-called New World.

Document EP-A-0 027 780 proposes a variety of bottles in particular for sparkling beverages, e.g. ciders or champagne. These bottles are provided with several internal grooves or ribs in the neck and can be opened after having removed a wire mesh which is crimped around neck and stopper. However, it seems that the beverages are not perfectly sealed by the co-operation of the bottle neck and the cork as described in EP-A-0 027 780, at least in some of the bottles, shown therein, because the internal grooves or ribs in the neck are forming tracks in the stopper along which gas and liquid can escape to the exterior. In one of the bottles of EP-A-0 027 780, the internal diameter of significantly increases at the lower end of the cork, i.e. is not cylindrical. Correspondingly the diameter of the cork significantly increases to the lower end (typically about a factor of two). Having such a non cylindrical cork stopper is typical for champagne bottles to increase the holding forces of the cork. Furthermore, the compression rate of champagne corks is typically rather high. Therefore, such bottles cannot be closed anymore by hand using the same cork. Nevertheless, when pressurized beverages are plugged, a wire mesh is additionally used to hold the stopper in place once the bottle is plugged to avoid unplugging due to the gas pressure inside the bottle. On the other hand, when the mesh is removed, unplugging of a bottle with a pressurized beverage is usually facilitated with the aid of the internal pressure of the beverage, such that e.g. a champagne cork can be extracted anyway by hand already without grooves or ribs in the neck. However, the applicable forces and sealing requirements are largely different between bottling pressurized beverages on the one hand side and wine or spirits on the other hand side.

In GB 132,589, U.S. Pat. No. 2,215,984, DE 183525, U.S. Pat. No. 1,406,722, FR 697,986, U.S. Pat. No. 1,560,158, BE 488693 equipment and processes for producing threaded containers are proposed. However, the containers produced by these processes are single-threaded with fine pitch and several revolutions and are therefore, cumbersome to open and to close.

It is an object of the present invention to provide a glass container, specifically a glass bottle for holding wine or spirits, which allows reversible and easy unplugging and plugging, without the negative image attached to a screw cap.

Another object of the invention is to provide a glass container for wine or spirits that retains plugging by a cork stopper, while allowing reversible and easy unplugging and plugging of non-pressurized beverages like wine and spirits by screwing and unscrewing of a cork with an essentially cylindrical plugging portion.

Another object of the invention is to provide a glass container with an internally cylindrical neck for bottling wine or spirits by a cork stopper with a cylindrical plugging portion that still guarantees good sealing and preservation of the wine or spirit, without excessive cork compression and without using an external holding device such as a wire mesh.

The objects of the invention are achieved by subject matter of claim 1. Preferred embodiments are defined in the dependent claims.

According to an aspect of the invention a glass container, specifically a bottle for storing non-pressurized beverages, e.g. a wine or spirit bottle is provided.

The container has a neck which is suitable for sealing the container with a compressible stopper having a plugging portion of cylindrical form. The neck defines a longitudinal axis and comprises an upper circular opening or finish and an internal thread which allows for reversible opening and closing of the container by unscrewing and screwing of said compressible stopper, respectively. The neck comprises an internal wall forming a straight cylindrical section, which extends from the opening over a height of at least 30 mm along the longitudinal axis.

The internal thread of the neck comprises at least two independent thread turns in the internal wall which are formed as ribs protruding from the internal wall starting at different angular positions around said longitudinal axis and being positioned in said straight cylindrical section, thereby forming a threaded section of internally cylindrical form. Furthermore, the neck comprises a first thread-free sealing section which is positioned beneath the threaded section, i.e. beneath a lower end of the thread turns, but still within said straight cylindrical section. Therewith, the straight cylindrical section is divided in at least two subsections, namely the threaded section defining said internal thread and the first thread-free sealing section, wherein both, the threaded section and the first thread-free sealing section are of internally cylindrical form and extend coaxial with the longitudinal axis of the neck.

Preferably, the first thread-free sealing section of internally cylindrical form extends beneath the threaded section from a lower end of the thread turns downwardly over a height of at least 5 mm, preferably over a height of at least 10 mm. Thus, the straight cylindrical section extends from the lower end of the thread turns downwardly over a height of at least 5 mm, preferably over a height of at least 10 mm along the longitudinal axis, thereby forming the first thread-free sealing section beneath the threaded section and being of cylindrical form.

That is, a first internally straight cylindrical and thread-free sealing ring of the internal wall of the neck with constant diameter is formed beneath the thread turns, so that a cylindrical stopper screwed in the bottle neck will totally conform to the plain thread free cylindrical surface beneath the thread turns, resulting in an improvement of preventing liquid leakage and passage of air from the exterior to the liquid along the thread turns at a moderate compression rate of a cork stopper.

The compressible stopper has a plugging portion of cylindrical form which extends beneath the threaded section into the first thread-free sealing section when being fully inserted in the neck of the glass container. Then the cylindrical plugging portion of the stopper is in full circumferential thread-free sealing contact with the internal wall of the neck over a height of at least 5 mm, preferably over a height of at least 10 mm, in the internally cylindrical first thread-free sealing section.

Further to improve the sealing capabilities of the container with inserted stopper, the straight cylindrical section of the internal wall of the neck is extending by preference also from the upper circular opening of the neck to the upper end of the thread turns over a height of at least 2 mm, preferably over a height of between 2 mm and 5 mm, thereby forming an second cylindrical thread-free sealing section between the upper circular opening and the threaded section. Therewith, a second internally straight cylindrical and thread-free ring of the internal wall of the neck is provided with constant diameter above the thread turns, so that the cylindrical plugging portion screwed in the bottle neck will be in full circumferential thread-free sealing contact with the internal wall above the thread turns. In other words, above the screw thread turns of the neck there is a second internally straight cylindrical and thread-free sealing ring with a diameter greater than the free diameter of the threaded section, and where a stopper will totally circularly conform to the wall when it is introduced in the neck to seal the container.

By preference, the thread turns extend over a height of at least 5 mm, but preferably not more than 20 mm, more preferably over a height of 10 mm±5 mm. In any case the turns extend preferably entirely within the straight cylindrical section. This geometry advantageously results in a good combination between holding/sealing properties and easy opening and closing of a wine or spirit bottle.

Preferably the straight cylindrical section has an internal diameter defined by the internal wall, wherein the internal diameter is selected within an interval of 18 mm to 21 mm. The neck has an outer diameter of between 26.5 mm and 28.5 mm at a position of 40 mm beneath the opening, which is advantageously slender.

Preferably the internal thread consists of between 3 and 5 independent thread turns. The thread turns are independently starting and ending at different angular positions, i.e. are staggered around the longitudinal axis, are straight and extend parallel to each other. Furthermore, the thread turns of the internal thread are identical and distributed at regular azimuthal angular intervals over the internal wall of the neck, in particular are staggered by an azimuthal angle of 360°/m, where m is the number of independent thread turns.

According to a preferred embodiment of the invention, the thread turns of the internal thread have a constant pitch angle of between 30° and 50°, preferably 37°±5°.

The ribs protruding from the internal wall and forming the thread turns have a preferred radial thickness between 0.2 mm and 3 mm, preferably a base width of between about 0.5 mm and 3 mm at the internal wall and preferably an essentially constant cross section.

Preferably the thread turns extend around the longitudinal axis over an azimuth angle of between 45° and 180°, more preferably of 90°±30°.

In, particular, such glass container allows plugging and unplugging by manual rotation of the stopper over an angle of less than 180° with modest effort. Preferably, a cork stopper with a cylindrical plugging portion and a head of larger diameter than the plugging portion is used, such that the user can grasp the head for unscrewing and screwing.

In this context, "cork stopper" includes any stopper made from natural rough or agglomerated cork. Nevertheless, agglomerated cork may be preferred for implementation of the invention. However the invention is not limited to the exclusive use of cork stoppers.

The neck geometry advantageously avoids the stored liquid from disturbingly penetrating into the thread turns while at the same time allowing the stopper to be self-holding without the need of an external fixing device like a wire mesh on the one hand side and to be manually reversibly unscrewable and screwable on the other hand side, both at a moderate compression rate of the stopper and without the aid of pressure inside the container when first opening the container. That is, this kind of plugging solution seals the container hermetically while providing great ease and practicality for the user, who can indefinitely open and close the container by a simple manual operation of screwing and unscrewing the stopper in the neck of the container. Furthermore, the container provides good sealing of the stopper both before and after the first opening of the container and for several consecutive openings thereafter, which turned out to be difficult to achieve with a screw cork stopper integrated in the neck of a wine or spirit bottle.

Furthermore, this kind of plugging solution preserves the high range image of the product held in the container when using a natural cork stopper while retaining the advantages of a metallic or plastic screw cap.

The use of cork stoppers is preferred in association with the container of the invention, because of its perfect recyclability and the growing character of cork commerce.

The bottle is preferably produced with a blow-and-blow process.

Various other characteristics will result from the following description with reference to the attached drawings which show non-limiting examples wherein same and similar elements are denoted with the same reference signs.

DETAILED DESCRIPTION OF THE PREFERRED EMBODIMENTS

Figure 1:
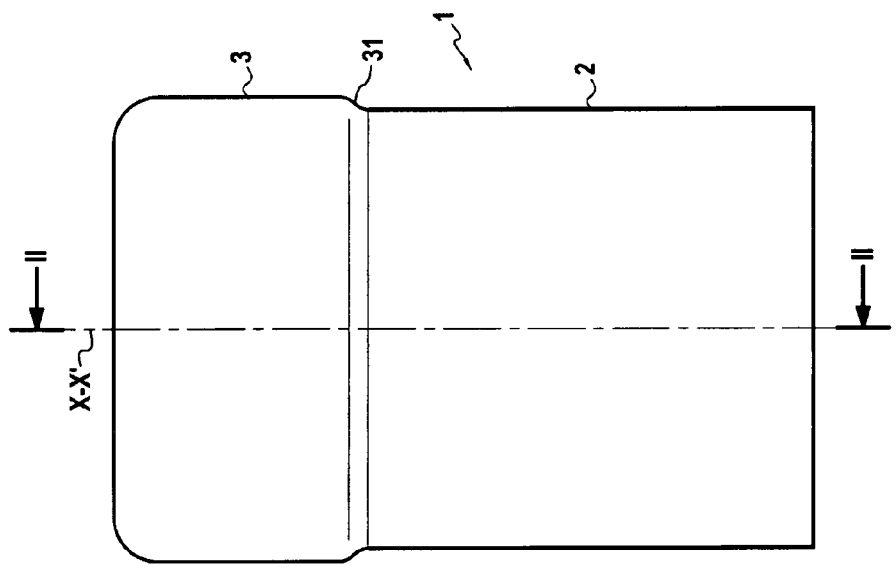
FIG. 1 shows a front view of a container neck according to the invention.
Figure 2:
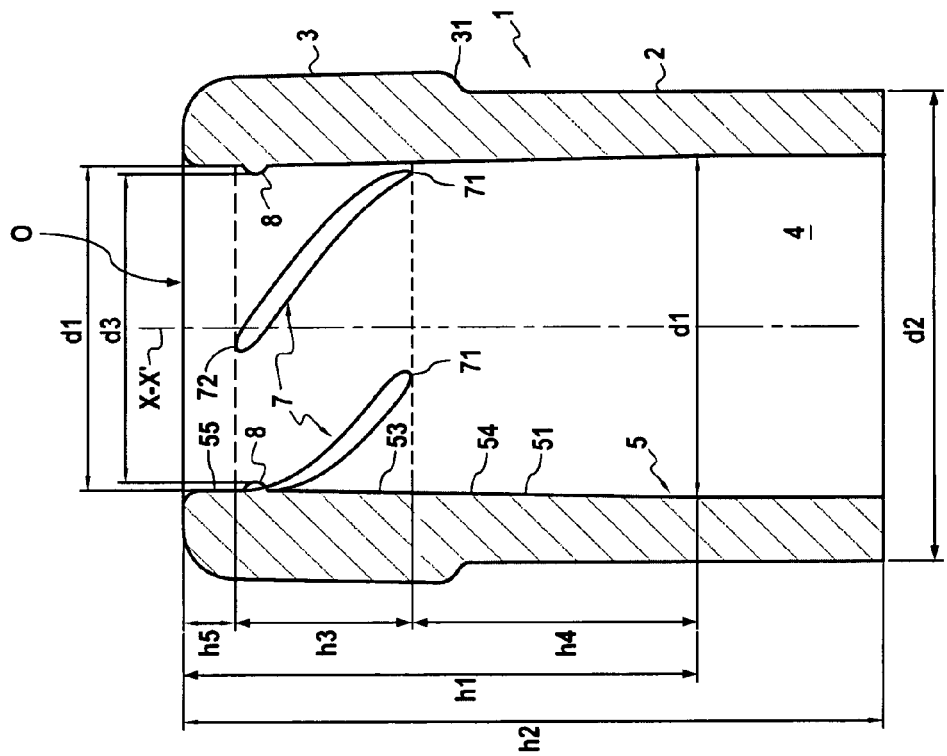
FIG. 2 shows the neck of FIG. 1 in longitudinal median cross section of the container.

FIGS. 1 and 2 show only the neck 1 of a container such as a wine or spirit bottle according to the present invention. The neck 1 has a cylindrical throat 2 ending in a head 3, also cylindrical, of slightly larger diameter than the throat, forming a retention shoulder 31 for a metallic or plastic cover for dressing the neck after plugging. Throat 2 and head 3 of neck 1 are coaxial and cylindrical around a longitudinal axis of revolution X-X' of the container and form an internal tubing 4 of essentially constant diameter over the whole length of neck 1 as shown. Neck 1 comprises at the upper end of the internal tube 4 a circular opening O allowing the container to be filled with a liquid and emptied through this opening and neck 1 to be plugged by insertion of a plug through the circular opening in the internal tube 4. In preferred manner, the container of the invention is intended to be plugged by a natural cork stopper, made of rough or agglomerated cork, which constitutes the preferred plugging material for proper conservation of the liquids such as wines and spirits for which the container of the invention is intended.

The container has an internal thread 6 being a multiple thread, in this example with four independent thread turns 7 on the internal wall 5 of neck 1, at the level of head 3 of neck 1.

More particularly, the internal wall 5 of neck 1 forms from the opening O over a height h1 of at least 30 mm a straight cylindrical section 51, with internal diameter d1 essentially constant over height h1 and by preference equal to 19 mm to 20 mm. By preference, the tolerance applied to this diameter d1 is ±0.5 mm. Within the straight cylindrical section 51 the angle of inclination between the internal wall 5 of neck 1 and the longitudinal axis X-X' is less than 3°. The diameter d1 is made with such small tolerance by constraining, during the fabrication of the container, the outside diameter d2 of the throat 2 of neck 1 to a value of 27.5 mm measured at height h2 of 40 mm beneath the opening O of neck 1.

The thread turns 7 of the internal threading of neck 1 are extending in the straight cylindrical section 51, over a height h3 of about 10 mm thereby forming the threaded section 53 of cylindrical form.

To ensure proper sealing, the straight cylindrical section 51 extends further from a lower end 71 of the thread turns 7 over a height h4 of about 20 mm (at least 5 mm, and by preference at least 10 mm) and is extending also from the upper circular opening O to an upper end 72 of thread turns 7 over a height h5 of about 3 mm (at least 2 mm and preferably up to 5 mm).

In this way, above and below the thread turns 7 there are two annular rings in the straight cylindrical section 51 which both have the same inside diameter d1 (except for the tolerances of each of the rings). Therewith, the two annular rings provide two cylindrical thread-free sealing sections 54, 55, where the stopper, when it is screwed in neck 1 through opening O, is perfectly circumferentially married against the plain internal wall 5 of neck 1 in these sections without disturbance of the thread turns 7, on both sides (above and beneath) of the thread turns 7.

This improves preventing air and liquid from entering and/or exiting the container by passing along the thread turns 7 inside neck 1.

To ensure proper sealing, the cork used for plugging threaded neck 1 can also be provided in advantageous manner with an external thread complementary to the internal thread 6 of neck 1. However, this is not mandatory; because the imprint of the cork can also be obtained during insertion of the cork in the neck of the bottle and kept hermetically sealed thanks to the resilience properties of cork.

The thread turns 7 on the internal wall 5 of neck 1 consist of ribs protruding from the internal wall 5. Advantageously, these thread turns 7 are identical and distributed at regular angular intervals over the internal surface 5 of neck 1. By preference, the ribs have a radial thickness of about 1 mm (between 0.2 and 3 mm, and by preference between 0.2 and 1 mm) and a base width at the internal wall 5 of about 1 mm perpendicular to the direction of extension of the ribs (perpendicular to a line defined by the pitch angle).

In other words the thread turns 7 are formed by protruding gadroons 8 on the internal wall 5 of the straight cylindrical section 51 of the neck. In this embodiment, the useful passage diameter d3 between the inner edges of the thread turns 7 is by preference between 18 mm and 19 mm, with a tolerance of ±0.5 mm.

Figure 3:
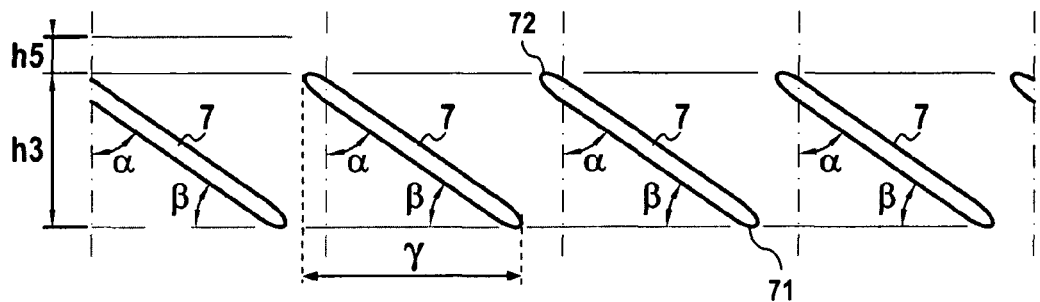
FIG. 3 shows a plan view of the internal surface of the unrolled threaded section of the neck shown in FIG. 2.

Referring to FIG. 3, the thread turns 7, forming the internal thread 6 of neck 1, have a pitch angle of $\beta=37°$, i.e. an angle of 37° relative to a horizontal section of the neck perpendicular to axis X-X'.

Furthermore, the preferred embodiment shown in FIGS. 1 to 3 has four thread turns 7, with one thread turn per angular sector of 90° of the internal cylindrical wall 5 of neck 1. Each thread turn 7 extends around the longitudinal axis X-X' over an azimuth angle of about $\gamma=90°$, wherein generally an azimuth angle $\gamma$ of between 45° and 180° is applicable. As shown in FIG. 3 the thread turns 7 do not overlap along the direction of the longitudinal axis X-X' with the next thread turn 7.

This configuration of the internal wall 5 of neck 1 with the independent thread turns 7 allows opening and closing of the container by easily unscrewing and screwing a cork stopper with moderate effort over an angle of less than 180° around the longitudinal axis X-X' of the container.

The choice of such thread angle and geometry is also advantageous for the fabrication of the container because it allows using a piston driven retractable plunger or forming core for imprinting the thread turns, resulting in simplicity of actuation and structure, which is advantageous in view of the internal diameter of the neck and the productivity and cost effectiveness of the fabrication method of the containers according to the invention.

Figure 4:
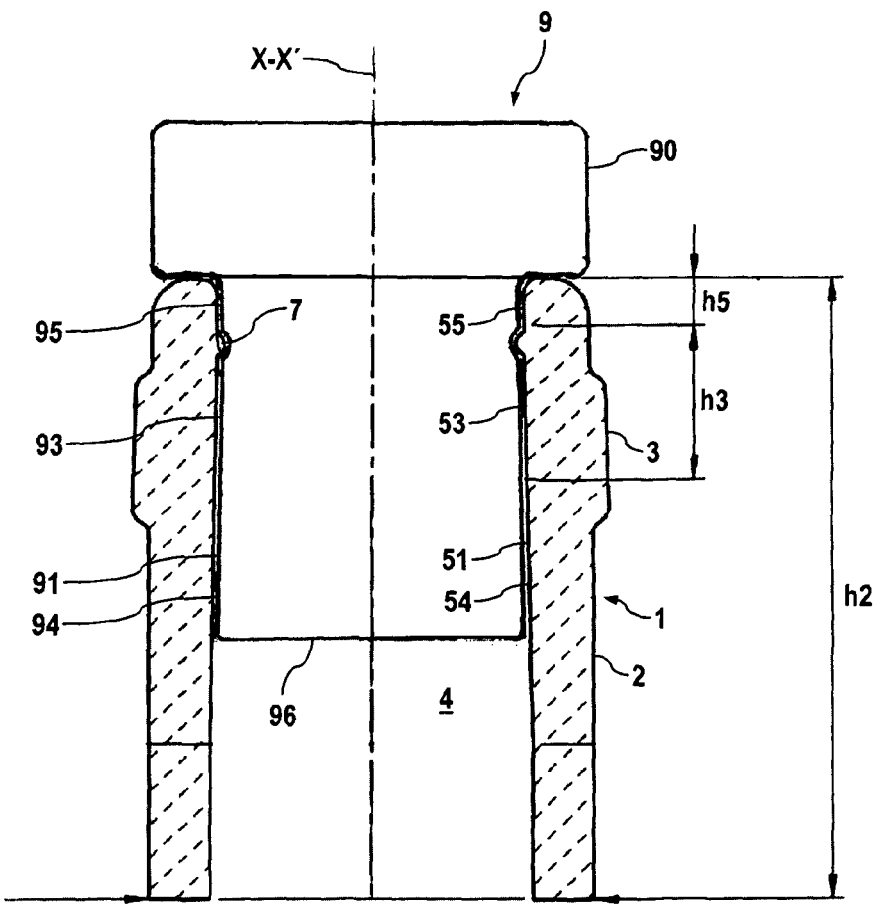
FIG. 4 shows a longitudinal median cross section of the neck shown in FIG. 2 with a cork stopper inserted.

FIG. 4 shows the bottle neck 1 with inserted cork stopper 9. The cork stopper 9 has a head 90 (not necessarily made of cork) and a cylindrical plugging portion 91 made of cork. The cylindrical plugging portion 91 is completely inserted within the straight cylindrical section 51 of bottle neck 1. The upper portion 95 (proximal to the head 90) of the cylindrical plugging portion 91 is in complete circumferential sealing contact with the plain internal wall 5 of the second thread-free sealing portion 55. An intermediate portion 93 is in contact with the threaded section 53 and an end portion 94 of the plugging portion 91 distal to the head 90 is in complete circumferential sealing contact with the plain internal wall 5 of the first thread-free sealing section 53. Therewith, the plugging portion 91 of the compressible stopper extends below the lower end 72 of the tread turns 7 on the one hand side, but is in sealing contact only with the straight cylindrical section 51 of the internal wall 5 of the neck 1 on the other hand side. The undersurface 96 of the cork 9 is positioned within the straight cylindrical section 51, more precisely in the cylindrical first thread-free sealing section 54.

Figure 5:
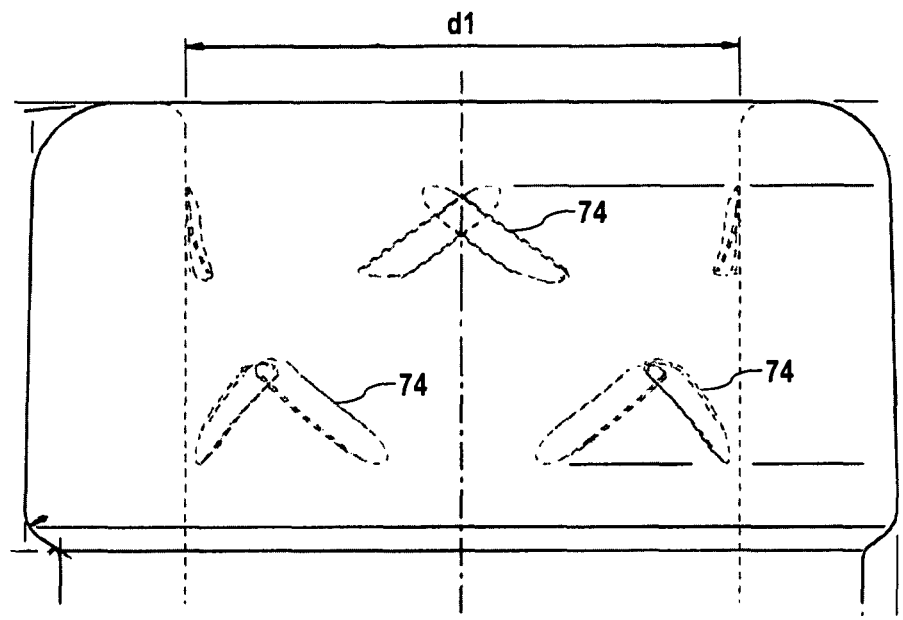
FIG. 5 shows a partially transparent side view of a neck of a container of a further embodiment.
Figure 6:
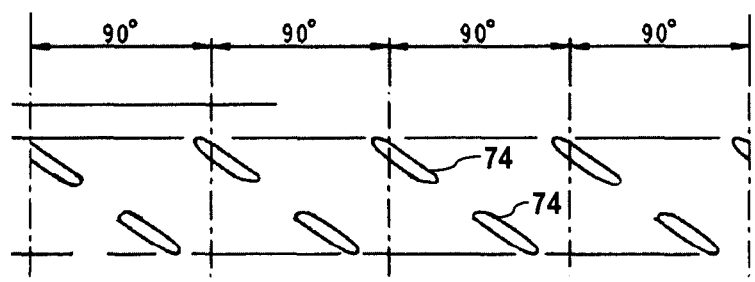
FIG. 6 shows a plan view of the internal surface of the unrolled threaded section of the neck shown in FIG. 5.

FIGS. 5 and 6 show a further embodiment of the container, where the internal thread turns 7 are formed as straight or successive punctual sections 74 and aligned in discontinuous manner along a line with a pitch angle of about $\beta=37°$.

The container of the invention provided with neck 1 is obtained by means of a blow-and-blow type process and can advantageously improve the comfort and sealing of neck 1 with a stopper 9 made of natural cork. This process produces in particular containers such as wine bottles with a weight between 300 g and 1000 g and comprising between 3 and 5 internal thread turns 7 in neck 1.

Herein, "height", "upper", "lower", "above", "beneath", downwardly" etc. are not to be understood as absolute orientations, but are to be understood relative to an upstanding container or bottle, i.e. to define extensions and positions parallel to the longitudinal axis.

It will be appreciated that the above-described embodiments have been set forth by way of example and illustration of the principles thereof and that further modifications and alterations may be made therein without thereby departing from the scope of the claims. Every feature may individually define an essential feature of the invention, irrespective of whether disclosed in the description, the claims or the drawings, even if disclosed only together with other features.

The invention claimed is:

1. A package comprising:
a glass container for storing non-pressurized beverages, the container having a cylindrical neck suitable for sealing the container with a compressible stopper having a plugging portion of cylindrical form, said neck comprising an upper circular opening and an internal thread allowing for reversible opening and closing of the container by unscrewing and screwing of said stopper, respectively, wherein the neck comprises an internal wall forming a straight cylindrical section, which extends from the opening over a height of at least 30 mm, wherein the internal thread of the neck comprises at least two independent thread turns in the internal wall and having a pitch angle between 30° and 50°, wherein the thread turns do not overlap along the direction of a longitudinal axis of the container and are in the form of ribs protruding from the internal wall and are positioned in said straight cylindrical section, thereby forming a threaded section of cylindrical form, and wherein the neck comprises a first thread-free sealing section which is positioned in said straight cylindrical section and beneath a lower end of said thread turns and a second thread-free sealing section positioned between said opening and an upper end of said thread turns; and
a stopper including a cylindrical plugging portion made of cork, wherein the cylindrical plugging portion of the stopper is carried within the straight cylindrical section of the neck, and includes:
an upper portion in complete circumferential sealing contact with the second thread-free sealing portion,
an intermediate portion in contact with the threaded section, and
an end portion in complete circumferential sealing contact with the first thread-free sealing section, such that the stopper extends below the lower end of the thread turns.

2. Glass container according to claim 1, wherein the straight cylindrical section extends from said lower end of the thread turns downwardly over a height of at least 5 mm.

3. Glass container according to claim 1, wherein the straight cylindrical section extends from the upper circular opening to an upper end of the thread turns over a height of at least 2 mm and up to 5 mm, thereby forming said second thread-free sealing section being of cylindrical form and positioned between the opening and the upper end of the thread turns.

4. Glass container according to claim 1, wherein the thread turns extend over a height of between 5 mm and 20 mm.

5. Glass container according to claim 1, wherein the straight cylindrical section has an internal diameter defined by the internal wall, wherein the internal diameter is within a range of 18 mm to 21 mm.

6. Glass container according to claim 1, wherein an outer diameter of the neck at a position of 40 mm beneath the opening is between 26.5 mm and 28.5 mm.

7. Glass container according to claim 1, wherein the internal thread comprises between 3 and 5 independent thread turns.

8. Glass container according to claim 1, wherein the thread turns of the internal thread are identical and distributed at regular angular intervals over the internal wall of the neck.

9. Glass container according to claim 1, wherein the thread turns of the internal thread have a pitch angle of 37°+/−5°.

10. Glass container according to claim 1, wherein the container has a longitudinal axis and the thread turns extend around the longitudinal axis over an azimuth angle of 90°+/−30°.

11. Glass container according to claim 1, wherein the thread turns of the internal thread have a radial thickness between 0.2 and 3 mm.

12. Glass container according to claim 1, wherein the thread turns of the internal thread consist of straight successive and discontinuous sections.

13. The package of claim 1, wherein an undersurface of the stopper is positioned within the first thread-free sealing section.

14. Glass container package comprising:
a glass container for storing non-pressurized beverages, and a compressible stopper the container having a cylindrical neck suitable for sealing the container with said compressible stopper having a plugging portion of cylindrical form, said neck comprising an upper circular opening and an internal thread allowing for reversible opening and closing of the container by unscrewing and screwing of said stopper, respectively, wherein the neck comprises an internal wall forming a straight cylindrical section, which extends from the opening over a height of at least 30 mm, wherein the internal thread of the neck comprises at least two independent thread turns in the internal wall, wherein the thread turns are in the form of ribs protruding from the internal wall and are positioned in said straight cylindrical section, thereby forming a threaded section of cylindrical form, and wherein the neck comprises a first thread-free sealing section which is positioned in said straight cylindrical section and beneath a lower end of said thread turns and a second thread-free sealing section positioned between said opening and an upper end of said thread turns, and
said compressible stopper having said plugging portion of cylindrical form, being inserted in the neck of the glass container, wherein the plugging portion is carried within said straight cylindrical section of said neck in contact with the internal wall of the neck only within said straight cylindrical section, but at least over the entire height of the internally cylindrical threaded section and over a height of at least 5 mm with the internally cylindrical first thread-free sealing section, and wherein the compressible stopper includes cork and has an upper portion in complete circumferential sealing contact with the second thread-free sealing portion, an intermediate portion in contact with the threaded section, and an end portion in complete circumferential sealing contact with the first thread-free sealing section, such that the stopper extends below the lower end of the thread turns, wherein insertion of the stopper in the neck results in an imprint of the internal thread on the stopper.

15. The glass container package of claim 14, excluding a wire mesh external holding device.

16. The package of claim 14, wherein an undersurface of the stopper is positioned within the first thread-free sealing section.

17. A package comprising:
a glass container including a neck having:
   a throat;
   a head terminating the throat;
   a retention shoulder between the throat and the head;
   an opening;
   an internal wall;
   at least two independent thread turns in the form of ribs protruding from the internal wall and forming a threaded section level with the head and having a pitch angle between 30° and 50°, wherein the thread turns do not overlap along the direction of a longitudinal axis of the container neck;
   a first thread-free sealing section positioned beneath a lower end of the thread turns and extending from the lower end of the thread turns downwardly over a height of at least 5 mm; and
   a second thread-free sealing section positioned between the opening and an upper end of the thread turns and extending from the opening to an upper end of the thread turns over a height of at least 2 mm and up to 5 mm; and
a compressible stopper carried within the neck and having:
   an upper portion in complete circumferential sealing contact with the second thread-free sealing portion of the glass container neck,
   an intermediate portion in contact with the threaded section, and
   an end portion in complete circumferential sealing contact with the first thread-free sealing section, such that the stopper extends below the lower end of the thread turns.

18. The package of claim 17, wherein an undersurface of the stopper is positioned within the first thread-free sealing section.

19. A package comprising:
a glass container having a neck including:
   an internal wall;
   a longitudinal axis; and
   at least two independent thread turns in the form of ribs protruding from the internal wall and forming a threaded section, wherein the thread turns of the internal thread have a pitch angle between 30° and 50°, extend around the longitudinal axis over an azimuth angle of 90°+/−30°, and do not overlap along the direction of the longitudinal axis;
   a first thread-free sealing section positioned beneath a lower end of the thread turns and extending from the lower end of the thread turns downwardly over a height 5 mm to 20 mm; and
   a second thread-free sealing section positioned between the opening and an upper end of the thread turns and extending from the opening to an upper end of the thread turns over a height of at least 2 mm and up to 5 mm; and
a compressible stopper including cork and having:
   an upper portion in complete circumferential sealing contact with the second thread-free sealing portion;
   an intermediate portion in contact with the threaded section; and
   an end portion in complete circumferential sealing contact with the first thread-free sealing section, such that the stopper extends below the lower end of the thread turns.

20. The glass container neck of claim 19 wherein the pitch angle is 37°+/−5°.

21. The package of claim 19, wherein an undersurface of the stopper is positioned within the first thread-free sealing section.

\* \* \* \* \*